UNITED STATES PATENT OFFICE.

CHRISTOPH HARTMANN, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION.

BLUE ANTHRAQUINONE DYE AND PROCESS OF MAKING SAME.

SPECIFICATION forming part of Letters Patent No. 704,798, dated July 15, 1902.

Application filed January 27, 1902. Serial No. 91,519. (Specimens.)

*To all whom it may concern:*

Be it known that I, CHRISTOPH HARTMANN, Ph. D., a citizen of the Empire of Germany, residing at Höchst-on-the-Main, Germany, have invented a certain new and useful Blue Anthraquinone Dye and Process of Making Same, of which the following is a specification.

I have found that sulfonic acids of the anthraquinone series dyeing a pure blue may be obtained if tetraämidoanthraquinones are treated with formaldehyde and sulfurous acid at ordinary or higher temperature. The dyestuffs thus obtained are dark-blue powders, soluble in water to a green-blue solution, which does not change on addition of dilute acids or alkalies. In a solution of common salt the dyestuffs are soluble with difficulty. In concentrated sulfuric acid they are soluble to a blue solution, which on being carefully poured on ice forms blue precipitates. They are evenly-dyeing blue-acid dyestuffs of good fastness to alkali, light, and boiling. The said tetraämidoanthraquinones are obtained from diamidoanthraquinones (by which are meant 1.5 and 1.8 diamidoanthraquinones or the diamidoanthraquinone obtained by reducing the crude product of nitration of the anthraquinone) by treating said diamidoanthraquinones after their transformation into acyl derivatives in concentrated sulfuric acid and by treating the dinitrodiacylamidoanthraquinones thus obtained by hydrolysis and reduction. They are blue powders, almost insoluble in water, readily soluble in acetone and acetic acid to a blue coloration from which they crystallize in needles of metallic luster when the solution is diluted with water. They dissolve in concentrated sulfuric acid to a colorless solution which becomes red on addition of water, while the sulfates of the bases are separated as red-brown crystals. The hydrochlorids are readily soluble in pure water but little in an excess of acid.

The process is illustrated as follows: 11.5 kilos of tetraämidoanthraquinone obtained from acidulated 1.5 diamidoanthraquinone are suspended in water and stirred at 25° to 30° centigrade with ninety kilos of hydrochloric acid of 22° Baumé specific gravity, fifty-four kilos of a bisulfite solution, (forty per cent.,) and twenty kilos of a formaldehyde solution, (forty per cent.) After about two hours the new dyestuff is formed, for the greater part, as a blue-green precipitate. It is isolated by filtration and washed with common salt. When dry, it is a dark-blue powder soluble in concentrated sulfuric acid to a blue and in water to a green-blue solution. The latter does not change on addition of a dilute solution of sodium carbonate or caustic soda, acetic acid, or sulfonic acid. It dyes wool in an acid-bath greenish-blue.

If tetraämidoanthraquinone obtained from crude acidyldiamidoanthraquinone is used as above described, a dyestuff is obtained which differs from the former only by the shade of its solutions and the somewhat duller blue of the dye it produces. By fractional extraction with water the duller dyeing elements being more readily soluble may be removed and the pure dyestuff above described remains, being less easily soluble. To obtain this dyestuff, it is not necessary, therefore, to start from pure 1.5-diamidoanthraquinone, and in many cases the crude dyestuff obtained as above stated suffices.

Having now described my invention, what I claim is—

1. The process for the manufacture of new blue dyestuffs of the anthraquinone series, which consists in treating the herein-described tetraämidoanthraquinones, with formaldehyde and sulfurous acid, substantially as described.

2. The dyestuffs obtained by combining the herein-described tetraämidoanthraquinones, with formaldehyde and sulfurous acid, being dark-blue powders, soluble in concentrated sulfuric acid to a blue and in water to a green-blue solution, which does not change on addition of dilute acids or alkalies, dyeing wool greenish-blue shades.

In testimony that I claim the foregoing as my invention I have signed my name in presence of two subscribing witnesses.

CHRISTOPH HARTMANN.

Witnesses:
 ALFRED BRISBOIS,
 BERNH. LEYDECKER.